US012713339B2

(12) United States Patent
Fripp et al.

(10) Patent No.: US 12,713,339 B2
(45) Date of Patent: Aug. 18, 2026

(54) MANAGING CIRCUIT SWITCHED VOICE SERVICE CONNECTIVITY IN A CELLULAR TELECOMMUNICATIONS NETWORK

(71) Applicant: BRITISH TELECOMMUNICATIONS PUBLIC LIMITED COMPANY, London (GB)

(72) Inventors: Douglas Fripp, London (GB); Arjun Parekh, London (GB); Richard Mackenzie, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 624 days.

(21) Appl. No.: 18/002,121

(22) PCT Filed: Jun. 17, 2021

(86) PCT No.: PCT/EP2021/066406
§ 371 (c)(1),
(2) Date: Dec. 16, 2022

(87) PCT Pub. No.: WO2021/255166
PCT Pub. Date: Dec. 23, 2021

(65) Prior Publication Data

US 2023/0239785 A1 Jul. 27, 2023

(30) Foreign Application Priority Data

Jun. 18, 2020 (GB) ..................................... 2009306

(51) Int. Cl.
*H04W 52/02* (2009.01)
*H04W 24/10* (2009.01)

(52) U.S. Cl.
CPC ....... *H04W 52/0206* (2013.01); *H04W 24/10* (2013.01); *H04W 52/02* (2013.01)

(58) Field of Classification Search
CPC .. H04W 52/0206; H04W 24/10; H04W 52/02
See application file for complete search history.

(56) References Cited

U.S. PATENT DOCUMENTS 6,775,780 B1 8/2004 Muttik
7,444,309 B2 10/2008 Branke et al.
(Continued)

FOREIGN PATENT DOCUMENTS

CN 101536560 A 9/2009
CN 102007801 A 4/2011
(Continued)

OTHER PUBLICATIONS

3GPP TR 36.927 V15.0.0 (Jul. 2018), "3rd Generation Partnership Project, Technical Specification Group Radio Access Network; Evolved Universal Terrestrial Radio Access (E-UTRA), Potential solution for energy saving for E-UTRAN (Release 15)," 650 Route des Luciales-Sophia Antipolis Valbonne—France, 22 pages.
(Continued)

*Primary Examiner* — Faruk Hamza
*Assistant Examiner* — Tito Q Pham
(74) *Attorney, Agent, or Firm* — EIP US LLP

(57) ABSTRACT

This disclosure relates to a method of operating a cellular telecommunications network, the cellular telecommunications network including a first base station for a first mobile network operator, a second base station, and a management node, the management node being configured to determine, based on a tracking area code, whether a base station associated with the tracking area code supports a circuit switched voice service. The method can include determining that at least a part of the first base station should enter energy saving mode; in response to the determination, identifying an energy saving solution that ensures continuity of the first circuit switched voice service; causing reconfiguration of the
(Continued)

first base station according to the identified energy saving solution so that: the first circuit switched voice service supported by the first base station enters energy saving mode and, the first base station uses a first tracking area code indicating that the first base station does not support the first circuit switched voice service; and continuing support of the first circuit switched voice service by the second base station, wherein the second base station uses a second tracking area code indicating that the second base station supports the first circuit switched voice service.

3 Claims, 10 Drawing Sheets

(56) References Cited

U.S. PATENT DOCUMENTS 7,656,799 B2 2/2010 Samuels et al.
7,890,941 B1 2/2011 Garud et al.
8,554,224 B2 * 10/2013 Soliman ............ H04W 52/0206 455/449
8,903,402 B2 12/2014 Guo et al.
8,983,496 B1 3/2015 Vivanco et al.
9,141,796 B2 9/2015 Kim et al.
9,160,749 B2 10/2015 Subramanian et al.
9,215,629 B2 12/2015 Hapsari et al.
9,301,105 B2 3/2016 Kim et al.
9,392,420 B2 7/2016 Fodor et al.
9,439,137 B2 9/2016 Kim et al.
9,462,546 B2 10/2016 Ohta et al.
9,615,318 B2 4/2017 Morper et al.
9,621,571 B2 4/2017 Kim et al.
9,659,176 B1 5/2017 Roter et al.
9,961,687 B2 5/2018 Kashiwase et al.
9,998,982 B2 6/2018 Horn et al.
10,057,743 B2 8/2018 Jabara et al.
10,104,110 B2 10/2018 Oliphant et al.
10,194,474 B2 1/2019 Fitch et al.
10,362,555 B2 7/2019 Briggs et al.
10,405,280 B2 9/2019 Mackenzie et al.
10,462,846 B2 10/2019 Morrill et al.
10,498,502 B2 12/2019 Mildh et al.
10,575,305 B2 2/2020 Webb et al.
10,728,844 B2 7/2020 Mackenzie et al.
10,848,965 B1 * 11/2020 Budhathoki ........ H04W 12/121
10,863,360 B2 12/2020 Mackenzie et al.
11,176,251 B1 11/2021 Plantenga et al.
11,354,409 B1 6/2022 Kenefick
11,470,548 B2 10/2022 Mackenzie et al.
11,556,640 B1 1/2023 Tully et al.
11,558,854 B2 1/2023 Diaz
11,604,153 B2 3/2023 Liu et al.
11,683,752 B2 6/2023 Mackenzie et al.
12,277,221 B2 4/2025 El-Moussa
12,323,901 B2 6/2025 Mackenzie et al.
2005/0187740 A1 8/2005 Marinescu
2007/0300298 A1 12/2007 Goranson et al.
2008/0102896 A1 * 5/2008 Wang .................... H04W 60/04 455/560
2009/0126017 A1 5/2009 Chahal
2009/0219888 A1 9/2009 Chen et al.
2010/0120447 A1 5/2010 Anderson et al.
2010/0157911 A1 6/2010 Hegde et al.
2010/0178912 A1 7/2010 Gunnarsson et al.
2010/0227623 A1 9/2010 De Pasquale et al.
2010/0257146 A1 10/2010 Memon et al.
2011/0044251 A1 * 2/2011 Tamura ................. H04W 60/04 370/328
2011/0190027 A1 8/2011 Michel et al.
2011/0274030 A1 11/2011 Wang et al.
2012/0002537 A1 1/2012 Bao et al.
2012/0026865 A1 2/2012 Fan et al.
2012/0079596 A1 3/2012 Thomas et al.
2012/0108245 A1 5/2012 Zhang et al.
2012/0157095 A1 6/2012 Fodor et al.
2012/0236828 A1 9/2012 Hapsari et al.
2012/0244869 A1 9/2012 Song et al.
2012/0257495 A1 10/2012 Schwarz et al.
2012/0264418 A1 10/2012 Lee et al.
2012/0275315 A1 11/2012 Schlangen et al.
2012/0329449 A1 * 12/2012 Das ................... H04W 52/0206 455/445
2013/0005340 A1 1/2013 Drazynski et al.
2013/0035033 A1 2/2013 Sanneck et al.
2013/0084873 A1 4/2013 Sharony et al.
2013/0095842 A1 4/2013 Jia et al.
2013/0130670 A1 5/2013 Samdanis et al.
2013/0150044 A1 6/2013 Zhang et al.
2013/0170435 A1 7/2013 Dinan
2013/0242720 A1 9/2013 Chou
2013/0252622 A1 9/2013 Kobayashi
2013/0260768 A1 10/2013 Guo et al.
2014/0018057 A1 1/2014 Yu et al.
2014/0038593 A1 2/2014 Kim et al.
2014/0050135 A1 2/2014 Zhang et al.
2014/0051437 A1 2/2014 Diachina et al.
2014/0071891 A1 3/2014 Zhou et al.
2014/0071943 A1 3/2014 Lee et al.
2014/0092765 A1 4/2014 Agarwal et al.
2014/0123280 A1 5/2014 Kedma et al.
2014/0126562 A1 5/2014 Gunnarsson et al.
2014/0187234 A1 * 7/2014 Chou ................. H04W 36/165 455/422.1
2014/0187236 A1 7/2014 Chiang et al.
2014/0194110 A1 * 7/2014 Suerbaum ......... H04W 52/0206 455/418
2014/0269547 A1 9/2014 Valliappan et al.
2014/0286218 A1 9/2014 Park et al.
2014/0364114 A1 12/2014 Zhao
2015/0063136 A1 3/2015 Shen et al.
2015/0067763 A1 3/2015 Dalcher et al.
2015/0092552 A1 4/2015 Bajj et al.
2015/0131524 A1 5/2015 Cavalcante et al.
2015/0140955 A1 5/2015 Chakraborty et al.
2015/0271714 A1 9/2015 Shetigar et al.
2015/0281974 A1 10/2015 Ghasemzadeh et al.
2015/0289141 A1 10/2015 Ghasemzadeh et al.
2015/0312769 A1 10/2015 Shindo
2015/0319658 A1 11/2015 Padden et al.
2015/0358892 A1 12/2015 Pandey et al.
2015/0358940 A1 12/2015 Zhang et al.
2016/0007242 A1 * 1/2016 Jeong .................... H04W 48/18 370/331
2016/0014661 A1 1/2016 Choi et al.
2016/0057159 A1 2/2016 Mn et al.
2016/0057699 A1 2/2016 Jang
2016/0088493 A1 3/2016 Byun et al.
2016/0094424 A1 3/2016 Niestemski et al.
2016/0100451 A1 4/2016 Wass et al.
2016/0150420 A1 5/2016 Byun et al.
2016/0174149 A1 6/2016 Byun et al.
2016/0179546 A1 6/2016 Yamada et al.
2016/0192177 A1 6/2016 Kim et al.
2016/0219504 A1 7/2016 Cho et al.
2016/0255529 A1 9/2016 Zhang et al.
2016/0295357 A1 * 10/2016 Grayson ................. H04W 4/02
2016/0321089 A1 11/2016 Sandlin et al.
2016/0323931 A1 * 11/2016 Huang .................. H04W 76/16
2016/0379136 A1 12/2016 Chen et al.
2017/0041098 A1 2/2017 Saghir et al.
2017/0055186 A1 2/2017 Donepudi et al.
2017/0055193 A1 2/2017 Mueck et al.
2017/0064557 A1 3/2017 Alsohaily et al.
2017/0083703 A1 3/2017 Abbasi et al.
2017/0086181 A1 3/2017 Briggs
2017/0171256 A1 * 6/2017 Liang .................... H04W 36/26
2017/0187607 A1 6/2017 Shaikh et al.
2017/0215191 A1 7/2017 Martin
2017/0289904 A1 10/2017 Li
2017/0303188 A1 10/2017 Fitch et al.
2017/0311255 A1 10/2017 Hessler et al.
2017/0318526 A1 11/2017 Wang et al.
2017/0359731 A1 12/2017 Soldati et al.

(56) References Cited

U.S. PATENT DOCUMENTS

2018/0027582 A1 1/2018 Yerramalli et al.
2018/0049098 A1 2/2018 Ueda
2018/0097826 A1 4/2018 Luan et al.
2018/0152469 A1 5/2018 Smith et al.
2018/0219735 A1 8/2018 Di-Cairano-Gilfedder et al.
2018/0262922 A1 9/2018 Mackenzie et al.
2018/0324676 A1 11/2018 Huang et al.
2018/0357413 A1 12/2018 Rivera
2018/0376327 A1 12/2018 Sivavakeesar
2019/0043350 A1 2/2019 Rosales et al.
2019/0121978 A1 4/2019 Kraemer et al.
2019/0159048 A1 5/2019 Feldkamp
2019/0191305 A1 6/2019 Dowlatkhah et al.
2019/0313329 A1 10/2019 Mackenzie et al.
2019/0394704 A1 12/2019 Lou et al.
2019/0394706 A1 12/2019 Phan et al.
2019/0394707 A1 12/2019 Wong et al.
2020/0026854 A1 1/2020 Guo et al.
2020/0037285 A1 1/2020 Sivavakeesar et al.
2020/0154332 A1 5/2020 Tsuda et al.
2020/0154516 A1* 5/2020 Gambhir-Parekh .. H04W 76/19
2020/0159917 A1 5/2020 Cervantez
2020/0174850 A1 6/2020 Sambotin et al.
2020/0244547 A1 7/2020 Uppili
2020/0329428 A1* 10/2020 Chou .................... H04W 36/22
2021/0326439 A1 10/2021 Hoang et al.
2022/0244953 A1 8/2022 Ji et al.
2023/0023229 A1 1/2023 Kumar et al.
2023/0216744 A1 7/2023 Roscoe et al.
2023/0224720 A1 7/2023 Mackenzie
2023/0232297 A1 7/2023 Mackenzie
2023/0239785 A1 7/2023 Fripp et al.
2023/0274000 A1 8/2023 El-Moussa
2023/0297671 A1 9/2023 El-Moussa
2025/0150964 A1 5/2025 Fujimoto et al.

FOREIGN PATENT DOCUMENTS

CN 102083145 A 6/2011
CN 102149101 A 8/2011
CN 102612842 A 7/2012
CN 102695251 A 9/2012
CN 102695253 A 9/2012
CN 102714856 A 10/2012
CN 102883378 A 1/2013
CN 103024880 A 4/2013
CN 103249111 A 8/2013
CN 103392360 A 11/2013
CN 103906203 A 7/2014
CN 104113897 A 10/2014
CN 104469830 A 3/2015
CN 104885494 A 9/2015
CN 104969625 A 10/2015
CN 105144768 A 12/2015
CN 105323830 A 2/2016
CN 105611554 A 5/2016
CN 102595564 B 8/2016
CN 104469830 B 10/2017
CN 107409316 A 11/2017
CN 110431860 A 11/2019
CN 110719593 A 1/2020
CN 110784604 A 2/2020
EP 2154917 A1 2/2010
EP 2203011 A1 6/2010
EP 2271142 A1 1/2011
EP 2375807 A1 10/2011
EP 2533571 A1 12/2012
EP 2613596 A1 7/2013
EP 2663131 A1 11/2013
EP 2806694 A1 11/2014
EP 2814279 A1 12/2014
EP 2916584 A1 9/2015
EP 2928225 A1 10/2015
EP 2975886 A1 1/2016
EP 3065438 A1 9/2016
EP 2975886 B1 8/2018
EP 3224959 B1 2/2019
EP 3472994 A1 4/2019
EP 3474176 A1 4/2019
EP 3472994 B1 10/2020
GB 2542620 A 3/2017
GB 2547943 A 9/2017
GB 2554543 A 4/2018
GB 2554544 A 4/2018
GB 2548796 B 7/2018
GB 2554451 B 2/2019
GB 2554453 B 3/2019
GB 2554543 B 3/2019
GB 2554544 B 3/2019
GB 2564427 B 1/2020
GB 2576555 A 2/2020
GB 2579042 A 6/2020
GB 202009306 8/2020
GB 2596114 A 12/2021
JP 2010508761 A 3/2010
JP 2013201576 A 10/2013
JP 2015130644 A 7/2015
JP 2015192252 A 11/2015
JP 2016519553 A 6/2016
KR 101907681 B1 10/2018
KR 20210144452 A 11/2021
WO 2008054668 A2 5/2008
WO 2009022976 A1 2/2009
WO 2010024743 A1 3/2010
WO 2011028158 A1 3/2011
WO 2011056023 A2 5/2011
WO 2012138125 A2 10/2012
WO 2012148442 A1 11/2012
WO WO-2013022505 A1 2/2013
WO 2013071813 A1 5/2013
WO 2013120274 A1 8/2013
WO 2013142361 A1 9/2013
WO 2013167335 A1 11/2013
WO 2014003431 A1 1/2014
WO WO-2014111806 A1 7/2014
WO 2014161896 A1 10/2014
WO WO-2014175919 A1 10/2014
WO 2015006047 A1 1/2015
WO 2015019317 A1 2/2015
WO WO-2015020479 A1 2/2015
WO 2015034775 A1 3/2015
WO WO-2015060172 A1 4/2015
WO WO-2015062060 A1 5/2015
WO 2015104552 A1 7/2015
WO 2015134985 A1 9/2015
WO WO-2016056964 A1 4/2016
WO 2016118145 A1 7/2016
WO 2016151653 A1 9/2016
WO WO-2016134676 A1 9/2016
WO 2016185946 A1 11/2016
WO 2017003580 A1 1/2017
WO WO-2018059858 A1 4/2018
WO WO-2018111166 A1 6/2018
WO 2019226173 A1 11/2019
WO 2020038676 A1 2/2020
WO WO-2020098640 A1 5/2020
WO WO-2020098985 A1 5/2020
WO 2024191326 A1 9/2024

OTHER PUBLICATIONS

3GPP TS 24.301 V17.2.0, "3rd Generation Partnership Project; Technical Specification Group Core Network and Terminals; Non-Access-Stratum (NAS) protocol for Evolved Packet System (EPS); Stage 3 (Release 17)," Technical Specification, (Mar. 2021), 588 pages.

3GPP TS 32.551 V15.0.0 (Jun. 2018), "3rd Generation Partnership Project, Technical Specification Group Services and System Aspects, Concepts and requirements; Telecommunication management, Energy Saving Management (ESM)," (Release 15), 650 Route des Luciales—Sophia Antipolis Val bonne—France, 26 pages.

3GPP TS 36.300 V16.1.0 (Mar. 2020), "3rd Generation Partnership Project, Technical Specification Group Radio Access Network,

(56) References Cited

OTHER PUBLICATIONS

Evolved Universal Terrestrial Radio Access (E-UTRA) and Evolved Universal Terrestrial Radio Access Network (E-UTRAN)," Overall description, stage 2, (Release 16), 387 pages.
4G Ameucas, "Self-Optimizing Networks: the Benefits of SON in LTE," XP40674838A, Jul. 2011, 69 pages.
Annex to the Commission implementing regulation, specifying the characteristics of small-area wireless access points pursuant to Article 57(2) of Directive (EU) 2018/1972 of the European Parliament and the Council establishing the European Electronic Communications Code, Feb. 27, 2020, 2 pages.
Barakat B., et al., "Energy Efficient Carrier Aggregation for LTE Advanced," Proceedings of the 8th IEEE GCC Conference and Exhibition, Muscat, Oman, Feb. 1-4, 2015, 5 pages.
Chavarria-Reyes E., et al., "Energy-Efficient Multi-Stream Carrier Aggregation for Heterogeneous Networks in 5G Wireless Systems," IEEE Transactions on Wireless Communications, vol. 15, No. 11, Nov. 2016, pp. 7432-7443.
Combined Search and Examination Report under Section 17 and 18(3) for GB Application No. 2009306.8, mailed on Nov. 16, 2020, 5 pages.
Combined Search and Examination Report under Section 17 and 18(3) for GB Application No. 2009328.2, mailed on Dec. 1, 2020, 5 pages.
Combined Search and Examination Report under Section 17 and 18(3) for GB Application No. 2009339.9, mailed on Dec. 15, 2020, 7 pages.
Combined Search and Examination Report under Section 17 and 18(3) for GB Application No. 2108635.0, mailed on Mar. 25, 2022, 14 pages.
ETSI Technical Specification, vol. 3GBPP, 2021, "Universal Mobile Telecommunications System (UMTS), LTE, 5G, Non-Access-Stratum (NAS) protocol for Evolved Packet System (EPS)", Stage 3 GGPP TS 24.301 Version 16.8.0 Release 16), 650, Route Des Lucioles F-06921 Sophia-Antipolis; France, vol. 3GPP CT, No. V16.8.0, Apr. 20, 2021, XP014397039, pp. 1-575, Retrieved from the Internet: URL:http://www.etsi.org/deliver/etsi_ts/124300_124399/124301/160800_60/ts_124301v160800p.pdf [retrieved on Apr. 20, 2021].
European Search Report for Application No. 21173324.1, mailed on Jun. 17, 2022, 10 pages.
Examination Report under Section 18(3) for GB Application No. 2009328.2, mailed on Oct. 18, 2022, 3 pages.
Examination Report under Section 18(3) for GB Application No. 2009328.2, mailed on Jul. 20, 2022, 3 pages.
Extended European Search Report for Application No. 21173324.1, mailed on Oct. 29, 2021, 10 pages.
First Office Action mailed Apr. 26, 2022 for Japanese Application No. 2021-099329 filed Jun. 15, 2021, 5 pages.
GSM Association, GSM Association, GSMA FLOOR2 Thewalbrook Building 25 Wallbrook London, UK, Apr. 22, 2013 (Apr. 22, 2013), XP040674838.
GSMA "Infrastructure Sharing: an Overview," last updated Jun. 18, 2019, Retrieved from https://www.gsma.com/futurenetworks/wiki/infrastructure-sharing-an-overview/, 18 pages.
International Preliminary Report on Patentability for Application No. PCT/EP2021/062478, mailed on Sep. 26, 2022, 35 pages.
International Preliminary Report on Patentability for Application No. PCT/EP2021/062479, mailed on Sep. 23, 2022, 27 pages.
International Preliminary Report on Patentability for Application No. PCT/EP2021/066406, mailed on Aug. 30, 2022, 20 pages.
International Search Report and Written Opinion for Application No. PCT/EP2021/062478, mailed on Aug. 25, 2021, 23 pages.
International Search Report and Written Opinion for Application No. PCT/EP2021/062479, mailed on Jul. 22, 2021, 21 pages.
International Search Report and Written Opinion for Application No. PCT/EP2021/066406, mailed on Oct. 14, 2021, 16 pages.
International Search Report and Written Opinion for Application No. PCT/EP2022/065836, mailed on Oct. 6, 2022, 19 pages.
Jots NHIB Specification, "Joint Operator Technical Specification of the neutral host in-building solution Annex 1 Architecture (v0.11)," 57 pages.
Kumar S.S., et al., "Energy Efficient Rate Coverage with Base Station Switching and Load Sharing in Cellular Networks," 2016 8th International Conference on Communication Systems and Networks (COMSNETS), 2016, 6 pages.
Morris D., Jots Neutral Host in-Building, Sep. 17, 2019, 16 pages.
Opadere J., et al., "Energy-Efficient Virtual Radio Access Networks for Multi-Operators Cooperative Cellular Networks," IEEE Transactions on Green Communications and Networking, vol. 3, No. 3, Sep. 2019, pp. 603-614.
Opadere J., et al. "Energy-Efficient RRH Sleep Mode for VirtualRadio Access Networks," IEEE, 2017, 6 pages.
Search Report under Section 17 for GB Application No. 2009312.6, mailed Nov. 23, 2020, 4 pages.
Written Opinion of the International Preliminary Examination for Application No. PCT/EP2021/062478, mailed on Jun. 22, 2022, 15 pages.
Written Opinion of the International Preliminary Examination for Application No. PCT/EP2021/066406, mailed on Jun. 9, 2022, 10 pages.
Written Opinion of the International Preliminary Examining Authority for Application No. PCT/EP2021/062479, mailed on Jun. 17, 2022, 10 pages.
"Recommended Practices for multi-vendor SON deployment", NGMN the engine of broadband wireless innovation Deliverable D2 Version 1.0 by NGMN Alliance; Reading Bridge House George Street Reading Berkshire RG 1 8LS UK, Jan. 28, 2014, 30 pages.
"Small Cell Forum Release 9.0; Document 176.09.01 LTE small cell SON test cases: Functionality and interworking; version 176.09.01", Feb. 21, 2017, 95 pages.
3GPP, "Issues on X2-GW deployment", 3rd Generation Partnership Project (3GPP), 3GPP TSG-RAN3 Meeting #79bis, R3-130571, Apr. 2013, 6 pages.
3GPP 36.420 v8.0.0 (Dec. 2007), "X2 general aspects and principals; Technical Specification; 3 Generation Partnership Project (Dec. 2007)", http://www.mc.ioi3GPP/Specs/36420-800.pdf, Dec. 2007, 11 pages.
3GPP TR 24.826 V11.0.0 (Jun. 2011), "3rd Generation Partnership Project; Technical Specification Group Core Network and Terminals; Study on impacts on signaling between User Equipment (UE) and core network from energy saving (Release 11)", 650 Route des Luciales—Sophia Antipolis Valbonne—France, 2011, 33 pages.
3GPP TR 32.816 V8.0.0 (Dec. 2008), "3rd Generation Partnership Project; Technical Specification Group Services and System Aspects; Telecommunication Management; Study on Management of Evolved Universal Terrestrial Radio Access Network (E-UTRAN) and Evolved Packet", Dec. 2008, 38 pages.
3GPP TR 36.942 V9.3.0, "Technical Specification Group Radio Access Network; Evolved Universal Terrestrial Radio Access (E-UTRA)", 3rd Generation Partnership Project; Radio Frequency (RF) system scenarios (Release 9), Jun. 2012, 83 pages.
3GPP TS 24.301 V16.8.0 (Mar. 2021-03), "3rd Generation Partnership Project Technical. Specification Group Core Network and Terminals; Non-Access-Stratum (NAS) protocol for Evolved Packet System (EPS); Stage 3 (Release 16)", 2021, 586 pages.
3GPP TS 36.300 V11.6.0 (Jun. 2013), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 650 Route des Luciales—Sophia Antipolis Valbonne—France, 2013, 209 pages.
3GPP TS 36.300 V13.3.0 (Mar. 2016), "3rd Generation Partnership Project; Technical Specification Group Radio Access Network; Evolved Universal Terrestrial Radio Access (E-UTRA) and Evolved Universal Terrestrial Radio Access Network (E-UTRAN)' Overall description; Stage 2 (Release 13)", 650 Route des Luciales—Sophia Antipolis Valbonne—France, 2016, 295 pages.
3GPP TS 36.300 V14.2.0, "Technical Specification Group Radio Access Network, Evolved Universal Terrestrial Radio Access (E-UTRA) and Evolved Universal Terrestrial Radio Access Network (E-UTRAN)",

(56) References Cited

OTHER PUBLICATIONS

3rd Generation Partnership Project, Overall description, Stage 2, Release 14, Mar. 2017, 330 pages.
3GPP TS 36.423 V14.2.0, "Technical Specification Group Radio Access Network, Evolved Universal Terrestrial Radio Access Network (E-UTRAN)", 3rd Generation Partnership Project, X2 application protocol (X2AP) (Release 14), Mar. 2017, 242 pages.
Ahn, et al., "A Genetic Algorithm for Shortest Path Routing Problem and the Sizing of Populations", IEEE Transactions on Evolutionary Computation, vol. 6, No. 6, Dec. 2002, pp. 566-579.
Alam, et al., "Annotated Control Flow Graph for Metamorphic Malware Detection", The Computer Journal, vol. 58, No. 10, 2014, 14 pages.
Alba, et al., "Solving the Vehicle Routing Problem by Using Cellular Genetic Algorithms", Lecture Notes in Computer Science, Apr. 2004, 11 pages.
Antonopoulos, "Mastering Bitcoin—Unlocking Digital Crypto-Currencies", O'Reilly Media, 2014, 282 pages.
Araujo, et al., "Diversity Through Multiculturality: Assessing Migrant Choice Policies in an Island Model", IEEE Transactions on Evolutionary Computation, vol. 15, No. 4, Aug. 2011, pp. 456-469.
Badotra, et al., "Open Daylight as a Controller for Software Defined Networking", International Journal of Advanced Research in Computer Science, vol. 8, No. 5, May 2017, pp. 1105-1111.
Barbosa, et al., "Access Point Design with a Genetic Algorithm", Sixth International Conference on Genetic and Evolutionary Computing, 2012, pp. 119-123.
Bruschi, et al., "Using Code Normalization for Fighting Self-Mutating Malware", Rapporto Tecnico N. 08-16, Mar. 2006, 14 pages.
Carlson, et al., "Scheduling to Minimize Interaction Cost", The Johns Hopkins University, Baltimore, Maryland, Jun. 2, 1965, 8 pages.
Chen, et al., "Analysis of Ant Colony Algorithm for Finding the Optimal Circuitous Route in the Communication Network of Power System", 5th International Conference on Electric Utility Deregulation and Restructuring and Power Technologies, Nov. 26-29, 2015, pp. 2532-2535.
Codan Radio, "RF Link Controlled Base Station", Codan Radio Communications https://www.codanradio.com/nroduct/rf-link-controlled-base [retrieved on Oct. 3, 2018], Aug. 8, 2017, 2 pages.
Erickson, "The Beacon OpenFlow Controller", HotSDN '13, Proceedings of the second ACM SIGCOMM workshop on Hot topics in software defined networking, Aug. 16, 2013, 6 pages.
Eskandari, et al., "A Graph Mining Approach for Detecting Unknown Malwares", Journal of Visual Languages & Computing, vol. 23, No. 3, 2012, pp. 154-162.
ETSI TR 136 927 V13.0.0 (Jan. 2016), "Technical Report LTE; Evolved Universal Terrestrial Radio Access (E-UTRA); Potential solutions for energy saving for Eutran (3GPP TR 36.927 version 13.0.0 Release 13)", 650 Route des Luciales—Sophia Antipolis Valbonne—France, 26 pages.
ETSI TS 132 551 V13.0.0 (Feb. 2016), "Technical Specification Universal Mobile Telecommunications System (UMTS); LTE; Telecommunication management; Energy Saving Management (ESM); Concepts and requirement (3GPP TS 32.551 version 13.0.0 Release 13)", 650 Route des Luciales—Sophia Antipolis Valbonne—France, 28 pages.
Fairbrother, et al., "A Two-Level Graph Partitioning Problem Arising in Mobile Wireless Communications", arXiv: 1705.08773v1 [math.QC], May 24, 2017, 23 pages.
Ghaddar, et al., "A branch-and-cut algorithm based on semidefinite programming for the minimum k-parition problem", Ann Oper Res DOI 10 1007/s10479-008-0481-4, Springer Science+Business Media, LLC 2008, Dec. 3, 2008, 20 pages.
Gill, et al., Transformative Effects of IoT, Blockchain and Artificial Intelligence on Cloud Computing: Evolution, Vision, Trends and Open Challenges:, Cornell University Library, available at https://arxiv.org/ftp/arxiv/papers/1911/1911.01941.pdf, Oct. 19, 2019, 30 pages.
Huawei, "Report of Email Discussion [97bis#19][LTE/FeD2D]-Grouphandover", 3GPP Draft, R2-1705300, 3rd Generation Partnership Project (3GPP), 3GPP TSG RAN WG2#98, Hangzhou, China, May 15-19, 2017, 18 pages.
Kang, et al., "Malware Classification Method via Binary Content Comparison", RACS '12: Proceedings of the 2012 ACM Research in Applied Computation Symposium, 2012, pp. 316-321.
Macqueen, "Some Methods for Classification and Analysis of Multivariate Observations", Fifth Berkeley Symposium, University of California, Los Angeles, 1967, pp. 281-297.
Melanie, "An Introduction to Genetic Algorithms", Fifth Printing, 1999, 162 pages.
Motorola, et al., "Draft CR capturing HeNB inbound mobility agreements", 3GPP Draft; R2-096401 CR HENB 36_300 Agreements_ V7, 3rd Generation Partnership Project (3GPP), Jeju, Korea XP050391033, Nov. 9, 2009, 4 pages.
Mukhopadhyay, et al., "Novel RSSI Evaluation Models for Accurate Indoor Localization with Sensor Networks", 978-1-4799-2361-8/14, 2014 IEEE, Bharti School of Telecommunication Technology and Management IIT Delhi Hauz Khas, New Delhi, 2014, 6 pages.
New Postcom, "X2 Connection and Routing for X2-GW Deployment", 3GPPDRAFT, R3-130225, 3rd Generation Partnership Project (3GPP), 3GPP TSG RAN WG3 Meeting #79, St. Julian's, Malta, Jan. 28-Feb. 1, 2013, 3 pages.
Ning, et al., "Fuzzy layered physical cell identities assignment in heterogeneous and small cell networks", Electronics Letters, vol. 52, No. 10, May 12, 2016, 2 pages.
Nokia Siemens Networks, "X2 Interface Proxy at DeNB", R3-101662, 3rd Generation Partnership Project(3GPP), 3GPP TSG-RAN WG Meeting #70, Montreal, Canada, May 10-14, 2010, 5 pages.
Qualcomm Europe, et al., "QoS principles for CSG members and nonmembers at hybrid access mode HeNBs", 3GPP Draft; R3-091022, 3rd Generation Partnership Project (3GPP), San Francisco, US XP050341407, May 4-8, 2009, 4 pages.
Qualcomm Europe, "QoS support for hybrid CSG cells", 3GPP Draft; R3-091454, 3rd Generation Partnership Project (3GPP), San Francisco, US; XP050341776., May 4, 2009, 3 pages.
Qualcomm Technologies, Inc, "LTE Small Cell SON Test Cases, Functionality and Interworking", San Diego, CA, USA, Jun. 5, 2015, 82 Pages.
Rendl, F, "Semidefinite Relaxations for Partitioning, Assignment and Ordering Problems", Cross Mark, Ann Oper Res (2016) 240 119-140 DOI 101007/s10479-015-2015-1; Springer Science+ Business Media New York 2015, Sep. 15, 2015, 22 pages.
Web article, "DSDP", NEOS Interfaces to DSDP, Jul. 3, 2017, 4 pages.
Web article, "Welcome to CVXPY", Welcome to CVXPY-CVXPY 0.4.9 documentation, Jul. 3, 2017, 1 page.
Wu, et al., "Physical Cell Identity Self-Organization for Home eNodeB Deployment in LTE", Hai Jiang Yi, Nokia Siemens Networks, 978-1-4244-3709-2/10, IEEE, Beijing China, 2010, 6 pages.
Younis, et al., "Cognitive MANET Design for Mission-Critical Networks", Military Communications; IEEE Communications Magazine, 0163-6804/09 2009 IEEE, Oct. 2009, 5 pages.
Zhang, et al., " Distributed Hash Table Theory, Platforms and Applications", Springer Briefs in Computer Science, 2013, pp. 1-73.
Zhong, et al., "A Malware Classification Method based on Similarity of Function Structure", IEEE/IPSJ 12th International Symposium on Applications and the Internet, IEEE Computer Society, 2012, pp. 256-261.
Extended European Search Report received for European Patent Application No. 25193167.1, mailed on Jan. 26, 2026, 6 pages.
English Translation of OA dated May 23, 2026.
Office Action dated May 23, 2026.

* cited by examiner

Legend

Normal (active) mode

Compensation mode

Energy saving mode

Legend

Normal (active) mode

Compensation mode

Energy saving mode

Legend

Normal (active) mode

Compensation mode

Energy saving mode

Legend

Normal (active) mode

Compensation mode

Energy saving mode

MANAGING CIRCUIT SWITCHED VOICE SERVICE CONNECTIVITY IN A CELLULAR TELECOMMUNICATIONS NETWORK

PRIORITY CLAIM

The present application is a National Phase entry of PCT Application No. PCT/EP2021/066406, filed Jun. 17, 2021, which claims priority from GB Patent Application No. 2009306.8, filed Jun. 18, 2020 each of which is hereby fully incorporated herein by reference.

TECHNICAL FIELD

The present disclosure relates to a cellular telecommunications network.

BACKGROUND

A cellular telecommunications network includes a base station providing voice and data services to a plurality of User Equipment (UE) via wireless communications. The base station is (at least in part) located at a cell site, which further includes supporting infrastructure (such as a power supply) for operating the base station. In traditional architectures, the cell site and base station are owned and operated by a single Mobile Network Operator (MNO) and the base station connects solely to that MNO's core network. The base station typically includes an antenna support (e.g. a mast, an antenna frame or rooftop attachment), one or more antennae and one or more controllers (e.g. a Radio Network Controller (RNC)).

There are several ways in which MNOs may cooperate to share infrastructure. The most basic example of shared MNO infrastructure, known as site sharing, is where the physical cell site is shared between MNOs but each MNO maintains ownership and control of the base station equipment (e.g. mast, antenna and controller). The base station supporting equipment (e.g. power supply) may or may not be shared between the MNOs in a site sharing arrangement. In a further example of shared MNO infrastructure, known as mast sharing, the base station's mast (or equivalent antenna support) is shared between MNOs, but each MNO maintains ownership and control of the remaining base station equipment (the antennae and controllers). Again, the base station supporting equipment (e.g. power supply) may or may not be shared between the MNOs in a mast sharing arrangement.

A more comprehensive form of shared MNO infrastructure is known as a Multi-Operator Radio Access Network (MORAN) in which the cell site, base station equipment and base station supporting equipment are shared between MNOs. The base station equipment must be configured to communicate with UEs of all MNOs, such as by transmitting each operator's Public Land Mobile Network (PLMN) identifier in the respective signals, but must communicate within each MNO's dedicated spectrum range. The base station equipment must also be configured to direct traffic to the appropriate MNO's core network. A similar arrangement is known as Multi-Operator Core Network (MOCN), in which the cell site, base station equipment and base station supporting equipment are again shared between MNOs and may also use shared spectrum ranges for communications with UEs of different MNOs.

A further alternative to shared infrastructure is where the cell site, base station and base station supporting equipment are owned and/or managed by a 3$^{rd}$ party, and one or more MNOs operate on the 3$^{rd}$ party's infrastructure. This is known as a "neutral host".

A challenge in modern cellular telecommunications network is for MNOs to meet energy efficiency targets. These targets may create a downward pressure on the maximum capacity and coverage an MNO's base station may offer. To address this concern, energy saving mechanisms were introduced which allow a base station to enter an energy saving mode (where most if not all operations are suspended). To ensure continuity of service to UE previously served by the energy saving base station, the UE may be transferred to one or more neighboring base stations. The neighboring base station may alter its coverage area in order to provide service.

SUMMARY

According to a first aspect of the disclosure, there is provided a method of operating a cellular telecommunications network, wherein the cellular telecommunications network includes a first base station for a first mobile network operator, a second base station, and a management node, the management node being configured to determine, based on a tracking area code, whether a base station associated with the tracking area code supports a circuit switched voice service, the method comprising determining that at least a part of the first base station should enter energy saving mode; in response to the determination, identifying an energy saving solution that ensures continuity of the first circuit switched voice service; causing reconfiguration of the first base station according to the identified energy saving solution so that: the first circuit switched voice service supported by the first base station enters energy saving mode and, the first base station uses a first tracking area code indicating that the first base station does not support the first circuit switched voice service; and continuing support of the first circuit switched voice service by the second base station, wherein the second base station uses a second tracking area code indicating that the second base station supports the first circuit switched voice service.

According to a second aspect of the disclosure, there is provided a computer program comprising instructions which, when the program is executed by a computer, cause the computer to carry out the first aspect of the disclosure.

According to a third aspect of the disclosure, there is provided a network node having a processor configured to carry out the first aspect of the disclosure.

BRIEF DESCRIPTION OF THE FIGURES

In order that the present disclosure may be better understood, embodiments thereof will now be described, by way of example only, with reference to the accompanying drawings in which.

DETAILED DESCRIPTION

Figure 1:
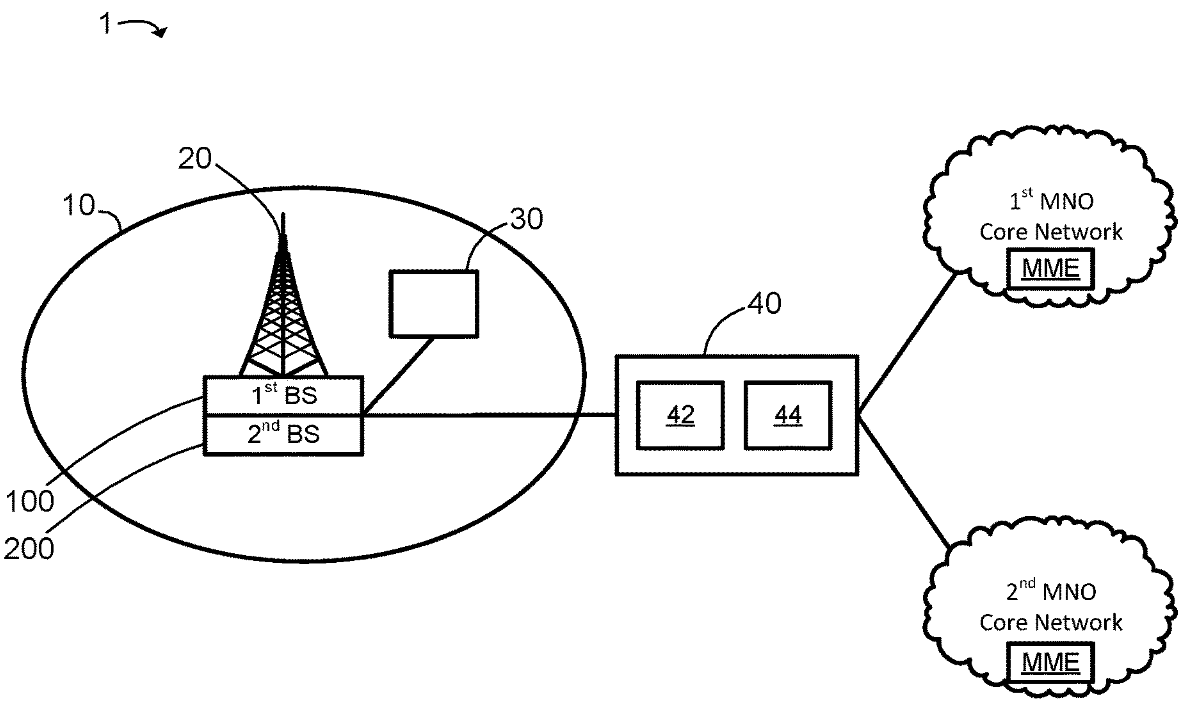
FIG. 1 is a schematic diagram of an embodiment of a cellular telecommunications network of the present disclosure.

A first embodiment of a cellular telecommunications network 1 will now be described with reference to FIG. 1. FIG. 1 illustrates a cell site 10 including a mast 20 and base station support equipment 30 (shown as a single unit, but may comprise several components such as a power supply, cooling unit, etc.). The cell site 10, mast 20 and base station supporting equipment 30 are shared by a first Mobile Network Operator (MNO) and second MNO. The first MNO deploys a first base station 100 at the cell site, such that one or more transceivers are positioned on the mast 20 and any processing equipment is located in the cell site 10 (and may utilize the base station supporting equipment 30). The second MNO also deploys a second base station 200 at the cell site 10, such that one or more transceivers for the second base station 200 are positioned on the mast 20 and any processing equipment is located in the cell site 10 (again, this may utilize the base station supporting equipment 30). The processing equipment of the first and second base stations 100, 200 may operate on dedicated hardware, or may operate in virtualized environments on a common hardware platform.

FIG. 1 also illustrates a neutral host site 40. The neutral host site 40 has a transport connection with the first and second base stations 100, 200, a first backhaul connection with the core network of the first MNO and a second backhaul connection with the core network of the second MNO. These connections are typically optical fiber connections. The neutral host site 40 includes a controller 42 and router 44. The router 44 is responsible for routing traffic for the first base station 100 to/from the core network of the first MNO, and for routing traffic for the second base station 200 to/from the core network of the second MNO. The controller 42 is responsible for the management of shared operations at the cell site and for implementing embodiments of the method of the present disclosure (discussed below).

The first base station 100 and second base station 200 are each configured to transmit a tracking area code. In the following embodiments, the first base station 100 is configured to transmit a first tracking area code if the first base station 100 provides a circuit switched voice service for users of the first MNO's network and to transmit a second tracking area code if the first base station 100 does not provide a circuit switched voice service to users of the first MNO's network. Similarly, the second base station 100 is configured to transmit a third tracking area code if the second base station 100 provides a circuit switched voice service to users of the second MNO's network and to transmit a fourth tracking area code if the second base station 100 does not provide a circuit switched voice service to users of the second MNO's network.

The core network of the first MNO includes a first Mobility Management Entity (MME). The core network of the second MNO includes a second MME. The first MME stores a database of tracking area codes in which a first set of tracking area codes are associated with base stations that provide a circuit switched voice service to users of the first MNO's network and a second set of tracking area codes are associated with base stations that do not provide a circuit switched voice service to users of the first MNO's network. In this embodiment, the first set of tracking area codes stored in the first MME's database includes a first tracking area code, and the second set of tracking area codes stored in the first MME's database includes a second tracking area code.

Similarly, the second MME stores a database of tracking area codes in which a first set of tracking area codes are associated with base stations that provide a circuit switched voice service to users of the second MNO's network and a second set of tracking area codes are associated with base stations that do not provide a circuit switched voice service to users of the second MNO's network. In this embodiment, the first set of tracking area codes stored in the second MME's database includes a third tracking area code, and the second set of tracking area codes stored in the second MME's database includes a fourth tracking area code.

Figure 2:
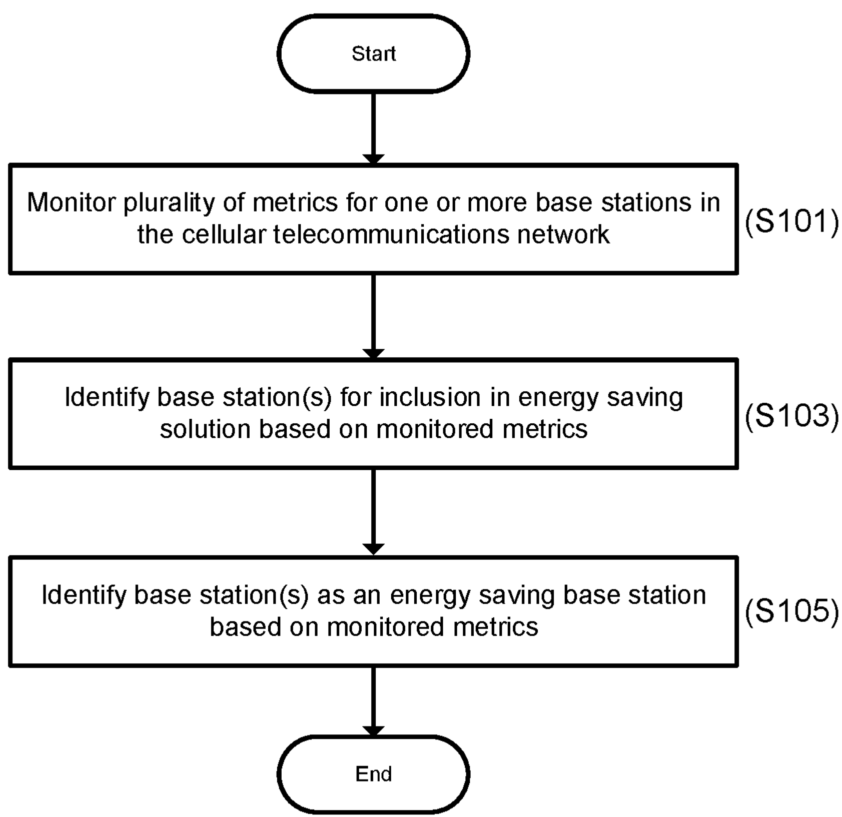
FIG. 2 is a flow diagram illustrating a first process implemented in a first and second embodiment of a method of the present disclosure.

Before discussing the embodiments of the method of the present disclosure in more detail, an overview of two processes (used in these embodiments) will be described. A first process is an energy saving trigger mechanism. In S101 of this first process (as shown in FIG. 2), the neutral host controller 42 monitors a plurality of metrics for the first base station 100 and second base station 200. These metrics include:

- A measure of load, such as radio throughput as a proportion of radio capacity or the proportion of radio resources being used;
- A measure of energy consumption (which may be converted to the equivalent measurement in units of carbon dioxide emissions); and
- An identifier of each service offering and commitment.

In S103, the neutral host controller 42 determines whether one or more of the plurality of metrics for each monitored base station satisfy at least one criterion for inclusion in an energy saving solution (e.g. to become a compensation base station). These energy saving solutions will be discussed in more detail in the second process, detailed below. The criterion may be, for example, that the measure of load indicates that the base station has sufficiently low load such that it may compensate for another base station that is entering energy saving mode, or the base station does not have any service offerings/commitments that prohibit a switch from normal (active) mode to either energy saving mode or compensation mode. All base stations that meet the at least one criterion are identified for inclusion in the candidate energy saving solutions. If all metrics for a base station do not meet the criterion/criteria, then that base station is not identified for inclusion in the candidate energy saving solutions.

In S105, the neutral host controller 42 determines whether one or more of the plurality of metrics for each monitored base station meet at least one energy saving criterion, such as the measure of load dropping below a threshold indicating sufficiently low load, the measure of energy consumption surpassing a threshold indicating that the base station (or MNO) has consumed too much energy and/or is responsible for too many units of carbon dioxide emissions (based on the MNO's energy targets), and/or that the base station does not implement a service offering/commitment that prevents it from entering energy saving mode. If one or more of these metrics for a base station meet the at least one criterion, then the neutral host controller identifies that base station for inclusion as a potential energy saving base station in the second process. If all metrics for a base station do not meet the relevant criterion/criteria, then that base station is not identified as a potential energy saving base station in the second process. Once all metrics for all base stations have been analyzed and at least one base station is identified for inclusion as a potential energy saving base station, then the second process is triggered.

Figure 3:
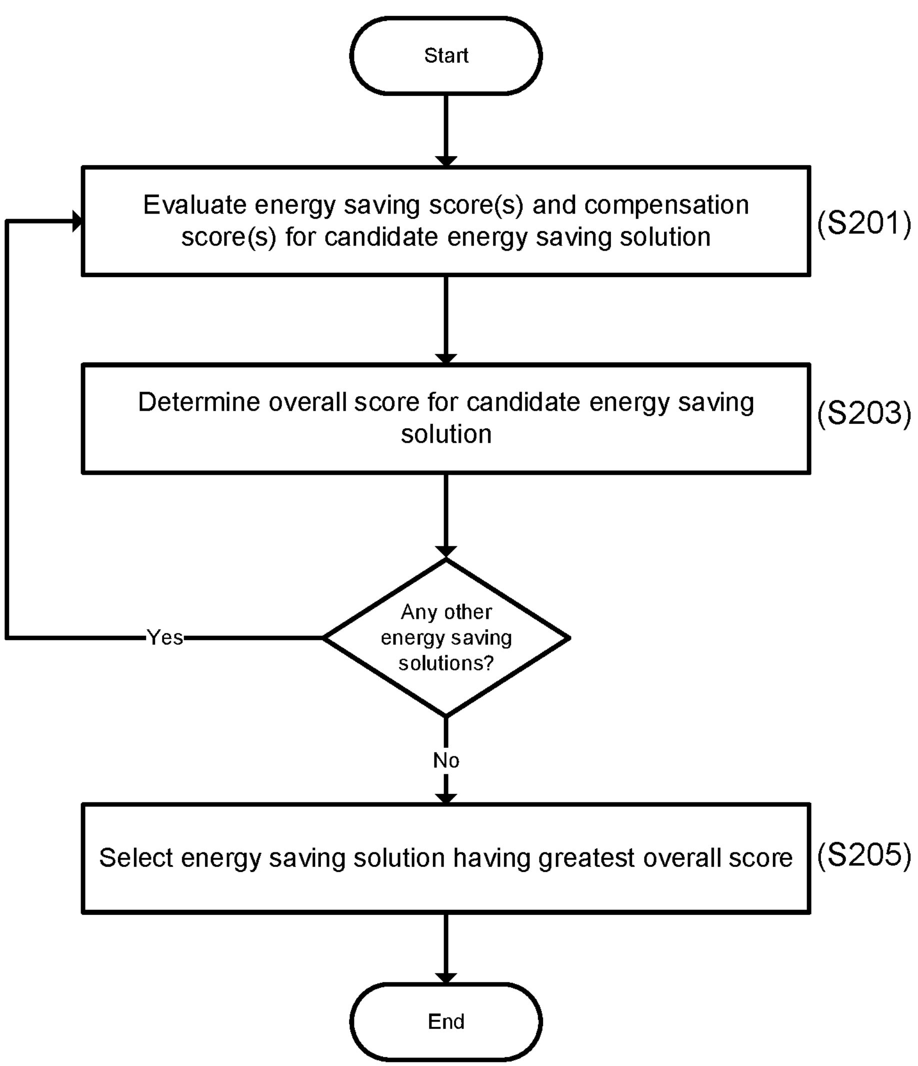
FIG. 3 is a flow diagram illustrating a second process implemented in the first and second embodiments of a method of the present disclosure.

The second process for determining a suitable energy saving solution is shown in FIG. 3. In overview, this neutral host controller 42 evaluates a plurality of candidate energy saving solutions based on the results of the first process. The neutral host controller 42 evaluates all possible variations of candidate energy saving solutions in which one or more of the base stations identified as potential energy saving base stations (in the first process) enter energy saving mode, and one or more base stations identified for inclusion as part of the energy saving solution act in either energy saving mode, normal (active) mode, or compensation mode. For each candidate, the neutral host controller 42 evaluates a weighted score of a base station's suitability to enter energy saving mode (the "energy saving score") for each base station entering energy saving mode in that candidate solution, a weighted score representing a base station's suitability to act in compensation mode (the "compensation score") for each base station entering compensation mode in that candidate solution, and sums these energy saving and compensation scores to get an overall score for that candidate solution.

In this example, the neutral host controller 42 evaluates a first candidate energy saving solution in which the first base station 100 enters energy saving mode and the second base station 200 enters compensation mode. In S201, the neutral host controller 42 evaluates the energy saving score of the first base station 100 and the compensation score of the second base station 200. The energy saving score, ES, is evaluated as:

$$ES_n^i = L_n^i * D_n^i * (1 - C_n^i)$$

In which,

- n is an identifier for the base station being evaluated for entering energy saving mode;
- i is an identifier for the candidate solution being evaluated (as there may be different ES score for the same base station where there are several different candidate solutions);
- L represents the load for base station n, normalized to a value between 0 and 1;
- D represents the desirability for energy saving for base station n (discussed in more detail below), normalized to a value between 0 and 1; and
- C represents the cost to users of base station n and users of each compensation base station when base station n is compensated for by the one or more compensation base stations of the candidate solution being evaluated (also discussed in more detail below), normalized to a value between 0 and 1.

A weighting may be applied to each factor, L, D, and C, based on the MNO's policy.

The compensation score, Comp, is evaluated as:

$$Comp_n^i = SC_n^i$$

In which,

- n is an identifier for the base station being evaluated for entering compensation mode;
- i is an identifier for the candidate solution being evaluated (as there may be different compensation score for the same base station where there are several different candidate solutions); and
- SC represents the spare capacity of base station n, normalized between 0 and 1 (e.g. based on the total capacity of the base station).

In S203, the energy saving score(s) and compensation score(s) and summed to determine the overall score for the first candidate energy saving solution. The second process then loops back to S201 to evaluate the overall score for the remaining candidate energy saving solutions. The energy saving solution having the greatest overall score is then selected as the energy saving solution to be implemented (S205).

The desirability factor, D, is an evaluation of the benefits to the base station, n, based on the relevant MNO's policy, of entering energy saving mode. To perform this evaluation, the neutral host controller 42 stores, in memory, each MNO's policy for determining the desirability factor, and retrieves the relevant policy when evaluating the desirability factor for a base station. Each policy may be based on one or more the following:

- The base station's measure of energy consumption relative to its energy consumption target; and/or
- An estimate of the energy saved by base station n by entering energy saving mode in combination i, offset by the additional energy required by the one or more base stations entering compensation mode to compensate for the base station n entering energy saving mode.

The base station's measure of energy consumption may be based on units of energy or its equivalent in units of carbon dioxide emissions (based on the amount of carbon dioxide emitted for each unit of energy), relative to the MNO's target. The MNO's target may also be a cumulative target, e.g. over a month.

The cost factor represents any cost to users of the base station entering energy saving mode or to users of the one or more compensation base station(s). This may be a cost of degraded service experienced by users when being served by the compensation base station, or a cost incurred by the one of compensation base station(s) in order to compensate for the energy saving base station (such as the resources required to switch to MOCN mode if the energy saving base station and compensation base station are of different mobile network operators). Again, to perform this evaluation, the neutral host controller 42 stores, in memory, each MNO's policy for determining the cost factor, and retrieves the relevant policy when evaluating the cost factor for a base station. Each policy may be based on one or more of the following:

- The services offered by the base station entering energy saving mode;
- The service commitments of the base station entering energy saving mode; and
- The ability for the base station(s) entering compensation mode to compensate for the services offerings/commitments of the base station entering energy saving mode.

The service offerings and commitments may be weighted so as to correlate with the relative cost for not providing a particular service. Service commitments may therefore be given greater weights than service offerings, as there may be more significant penalties for not providing a committed service.

As illustrated in the embodiments of the method of the present disclosure, the base station entering energy saving mode may offer (or be committed to providing) a circuit switched voice service. If the base station(s) entering compensation mode cannot offer a circuit switched voice service, then the cost of degraded service is relatively high. Similarly, the base station entering energy saving mode may offer a tailored service, such as an ultra-low latency, ultra-reliable service, which cannot be offered by the base station(s) entering compensation mode. Again, that would result in a relatively high cost of degraded service.

As noted above, there are a plurality of candidate energy saving solutions available for any given arrangement. In the most basic scenario having a first and second base station in which both are potential energy saving base stations, there are at least two candidate energy saving solutions available in which the first base station enters energy saving mode and the second base station enters compensation mode, or the second base station enters energy saving mode and the first base station enters compensation mode. However, there may be many more options that may be evaluated, such as when there is a third base station being evaluated for a switch to energy saving or compensation mode, and/or when each base station serves users according to a plurality of protocols and these services may be independently switched to energy saving or compensation mode, and/or when each base station uses multiple spectrum ranges (multiple "carriers") for communications with UE and each carrier may be independently switched to energy saving or compensation mode. In scenarios where a base station provides a plurality of access options (e.g. via different protocols or different carriers), the first and second processes may perform their analyses on each of the plurality of access options. That is, the first process may analyze metrics for each access option to determine whether each access option is marked for inclusion in the candidate energy saving solutions and whether each access option is marked for entering energy saving mode, and the second process may analyze a plurality of candidate energy saving solutions in which each access option is acting in either energy saving mode, normal (active) mode, or compensation mode.

Figure 4:
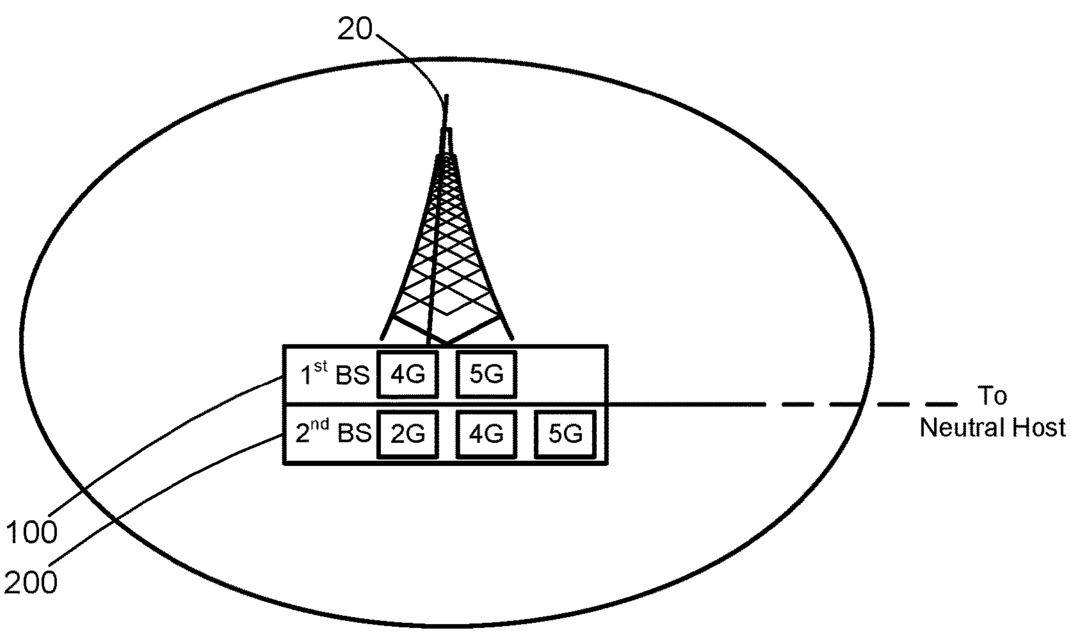
FIG. 4 is a schematic diagram of a cellular telecommunications network implementing the first embodiment of the method of the present disclosure, in a first configuration.

Several embodiments of a method of the present disclosure will now be described. In each embodiment, the first and second base stations 100, 200 are in an initial configuration in which (as shown in FIG. 4) the first base station 100 is configured to provide a "4G" service (i.e. based on one or more of Release 8 to Release 14 of the 3$^{rd}$ Generation Partnership Project (3GPP)), and a "5G" service (i.e. based on one or more of Release 15 and any subsequent Release of 3GPP considered as a 5G service), and the second base station 200 is configured to provide 4G and 5G services and is further configured to provide a "2G" service (i.e. based on one or more of the Global System for Mobile Communications (GSM) specifications of the European Telecommunications Standards Institute (ETSI)). The first base station 100 therefore provides voice services via Voice of Internet Protocol (VoIP) technology, and the second base station 200 provides voice services via VoIP for any 4G and 5G users or via a circuit switched voice service for 2G users (the VoIP 4G/5G service is optional, as the 2G voice service may be used for all voice services and 4G/5G used for data services).

In this initial configuration, the first base station 100 broadcasts the second tracking area code (indicating that it does not provide a circuit switched voice service to users of the first MNO's network) and the second base station 200 broadcasts the third tracking area code (indicating that it does provide a circuit switched voice service to users of the second MNO's network).

Figure 5:
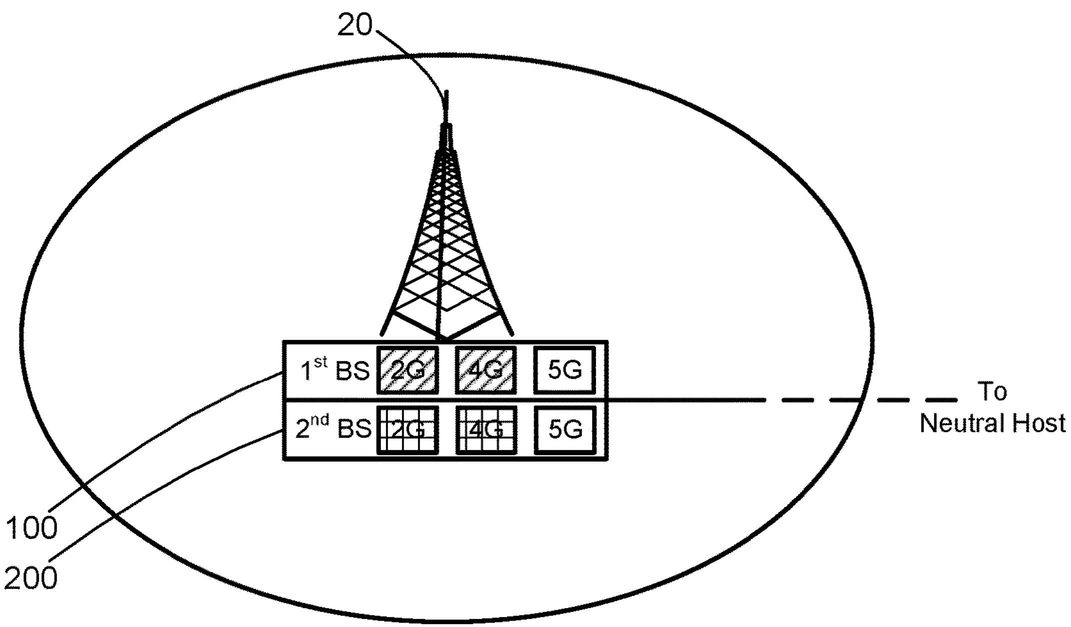
FIG. 5 is a schematic diagram of the cellular telecommunications network of FIG. 4, in a second configuration.
Figure 6:
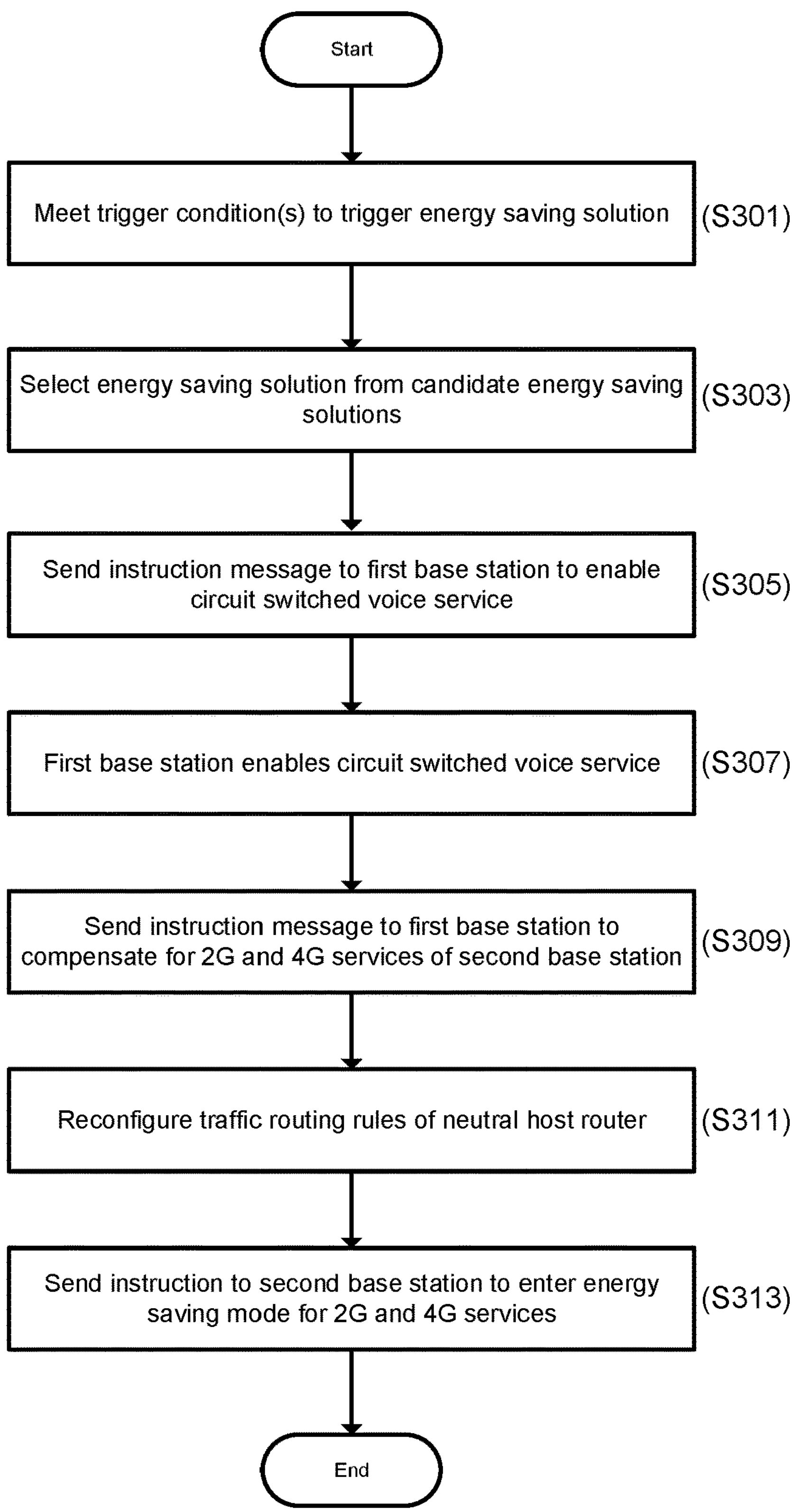
FIG. 6 is a flow diagram illustrating the first embodiment of the method of the present disclosure.

A first embodiment of a method of the present disclosure will now be described with reference to FIGS. 4 to 6. As noted above, FIG. 4 represents an initial configuration of the cellular telecommunications network. In S301, as shown in the flow diagram of FIG. 6, the neutral host controller 42 performs the first process (as described above in relation to FIG. 2) and determines that an energy saving threshold has been met. This triggers S303, in which the neutral host controller 42 performs the second process (as described above in relation to FIG. 3) so as to evaluate an overall score (based on the energy saving scores and compensation scores) for each candidate energy saving solution (based on all variations of base stations acting in either energy saving mode, normal (active) mode or compensation mode, wherein the base stations entering energy saving mode include those identified as potential energy saving base stations in the first process). In this embodiment, the energy saving options include:

1. The first base station 100 entering energy saving mode for all services (i.e. its 4G and 5G service) and the second base station 200 entering compensation mode for the first base station's 4G and 5G services;
2. The second base station 200 entering energy saving mode for all services (i.e. its 2G, 4G and 5G service) and the first base station 100 entering compensation mode for the second base station's 4G and 5G services only;
3. The second base station 200 entering energy saving mode for its 2G and 4G services (thus maintaining its 5G service), and the first base station 100 enabling a 2G service and entering compensation mode for the second base station's 2G and 4G services.

The evaluated overall scores for each candidate energy saving solution indicate that the most suitable energy saving solution is option 3. The overall score for the first candidate energy saving solution is positively influenced by the cost factor (as the second base station can provide all services of the first base station 100), but has negative influences from one or more of the load factor (e.g. the first base station 100 having a proportionately high load based on the first MNO's policy), the first base station's desirability factor (e.g. the first base station 100 having a low energy consumption based on the energy saving targets of the first MNO's policy and/or the first base station 100 not saving much energy by entering energy saving mode and/or the second base station 100 consuming a significant amount of additional energy to compensate for the first base station 100), and/or the spare capacity factor (e.g. the second base station 200 having limited spare capacity). Furthermore, there are significant negative influences on the overall score for the second candidate energy saving solution for the cost factor, as the first base station 100 cannot compensate for the 2G service if the second base station 200 enters energy saving mode. However, the third energy saving option involves the first base station 100 enabling a 2G service so that it may then compensate for the 2G service previously offered by the second base station 200. Accordingly, the cost factor of the third candidate energy saving solution does not have the same negative influences of the second candidate energy saving solution and the third candidate energy saving solution therefore has a greater overall score than the second candidate energy saving solution.

Furthermore, in this example, the third candidate energy saving solution has a greater overall score than the first candidate energy saving solution. Although there may be a greater negative influence from the desirability factor (due to the first base station 100 consuming more energy as it now provides a 2G service), there are more positive influences from one or more of the load factor, another factor of the first base station's desirability factor (e.g. energy saved by the second base station 200 entering energy saving mode), and/or spare capacity factor that result in a greater overall score for the third candidate energy saving solution than the first candidate energy saving solution. Accordingly, the neutral host controller 42 selects the third energy saving solution.

In S305, the neutral host controller 42 sends an instruction message to the first base station 100 to cause the first base station 100 to enable a 2G service. In response, in S307, the first base station 100 enables the 2G service by activating a 2G radio function and utilizing the first MNO's 2G licensed spectrum (that previously wasn't being used by the first base station 100). In other implementations, the first base station 100 may reassign spectrum ("refarm") from other protocols (e.g. the first MNO's 4G and/or 5G spectrum to be used for 2G services), use some of second MNO's licensed spectrum for 2G services (e.g. under a spectrum sharing agreement), use shared licensed spectrum (e.g. Licensed Shared Access), or unlicensed spectrum.

In S309, the neutral host controller sends a further instruction message to the first base station 100 to cause the first base station 100 to reconfigure to compensate for the second base station 200. This includes a switch from a MORAN configuration to a MOCN configuration, in which the first base station 100 begins transmitting both the first MNO's Public Land Mobile Network (PLMN) identifier and the second MNO's PLMN identifier, and accepts handovers and redirections of all users being served by the second base station 200. As part of this reconfiguration, the first base station 100 connects to both the first MME of the first MNO's core network and the second MME of the second MNO's core network. As the first base station 100 is enabling a 2G service for at least users of the second MNO's network, the first base station 100 retrieves, from the second MME, the third tracking area code indicating that it provides a circuit switched voice service to users of the second MNO's network. The first base station 100 then broadcasts this third tracking area code.

Additionally, in a scenario where the newly-enabled 2G service of the first base station 100 may also be used by users of the first MNO's network, then the first base station 100 switches from broadcasting the second tracking area code to broadcasting the first tracking area code (indicating that it also provides a circuit switched voice service to users of the first MNO's network) in addition to broadcasting the third tracking area code.

In S311, the neutral host controller 42 reconfigures the neutral host router so that any 2G and/or 4G traffic for the second MNO's users now being served by the first base station 100 is routed between the first base station 100 and the second MNO's core network.

In S313, the neutral host controller 42 sends an instruction message to the second base station 200 to cause the second base station to enter energy saving mode for its 2G and 4G services. As part of this reconfiguration, the second base station 200 switches from broadcasting the third tracking area code to broadcasting the fourth tracking area code (indicating that it does not provide a circuit switched voice service to users of the second MNO's network). The final state of the network is illustrated in FIG. 5.

This first embodiment therefore provides an energy saving solution having consideration for a circuit switched service (the 2G service), so that the circuit switched service is maintained following implementation of the energy saving solution. Although such a solution may not provide the greatest amount of energy savings, users still maintain their circuit switched service. Furthermore, by adjusting the weightings of the various factors in the energy saving score and compensation score, the MNOs may tailor their network's response to favor either energy saving or maintaining service.

This first embodiment also provides an additional benefit in ensuring a User Equipment (UE) that requires a circuit switched voice service (for example, a UE that is not configured for voice services of the 4G and 5G cellular telecommunications protocols) does not connect to a base station that no longer provides a circuit switched voice service. This process is illustrated by the flow diagram of FIG. 10. When a UE that requires a circuit switched voice service, that is not connected to the second base station 200, receives the fourth tracking area code broadcast by the second base station 200, it may initiate a tracking area code update process. As part of this process, the UE sends a tracking area update request to the second MME, via the second base station 200, which includes the fourth tracking area code (received at the second MME in S601). On receipt of the tracking area update request, in S603, the second MME determines whether the UE requires a circuit switched voice service based on the capabilities of the UE. These capabilities may already be known to the second MME (from an earlier capability signaling procedure) or retrieved on receipt of the tracking area update request (e.g. by retrieving its subscription status from the Home Subscriber Server (HSS)). In this example, the second MME determines that the UE requires a circuit switched voice service and the process continues to S605 in which the second MME determines whether or not the second base station 200 provides a circuit switched voice service to users of the second MNO's network. This is achieved, in this embodiment, by performing a lookup operation with its database of tracking area codes (which are each marked as being for base stations that either provide circuit switched voice service to users of the second MNO's network or do not provide circuit switched voice service to users of the second MNO's network) to determine whether or not the fourth tracking area code is associated with base stations that provide a circuit switched voice service to users of the second MNO's network. In this example, the second MME determines from this lookup operation that the second base station 200 does not provide a circuit switched voice service to users of the second MNO's network. Accordingly, in S607, the second MME sends a tracking area update reject message to the UE. This prevents the UE from connecting to the second base station 200 when the second base station 200 does not provide a circuit switched voice service.

Furthermore, in this embodiment, the tracking area update reject message includes a cause code that causes the UE to update a list of forbidden tracking area codes with the fourth tracking area code. This will prevent the UE from connecting to any base station that transmits the fourth tracking area code without having to perform the tracking area update/reject process outlined above. This list of forbidden tracking area codes is stored in the UE until it is reset.

Following the rejected tracking area update request, the UE may connect to a base station that provides a circuit switched voice service, such as the first base station 100 that has enabled a circuit switched voice service. That is, following the above process of FIG. 10, when the UE receives the third tracking area code broadcast by the first base station 100 and sends a tracking area update request to the first base station 100, the first base station 100 forwards the tracking area update request message to the second MME (using the connection established to the second MNO's core network as part of the switch to MOCN mode). The second MME determines that the third tracking area code broadcast by the first base station 100 indicates that the first base station 100 does provide a circuit switched voice service to users of the second MNO's network and, in response, sends a tracking area update accept message to the UE (S609) permitting the UE to connect to the first base station 100.

Figure 7:
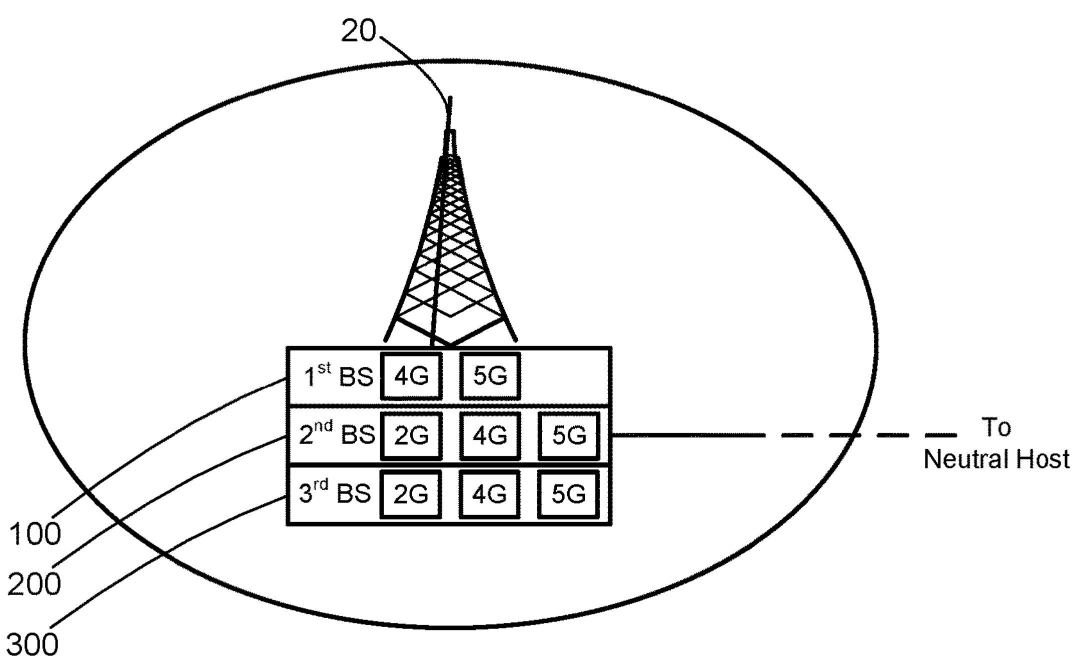
FIG. 7 is a schematic diagram of a cellular telecommunications network implementing the second embodiment of the method of the present disclosure, in a first configuration.
Figure 8:
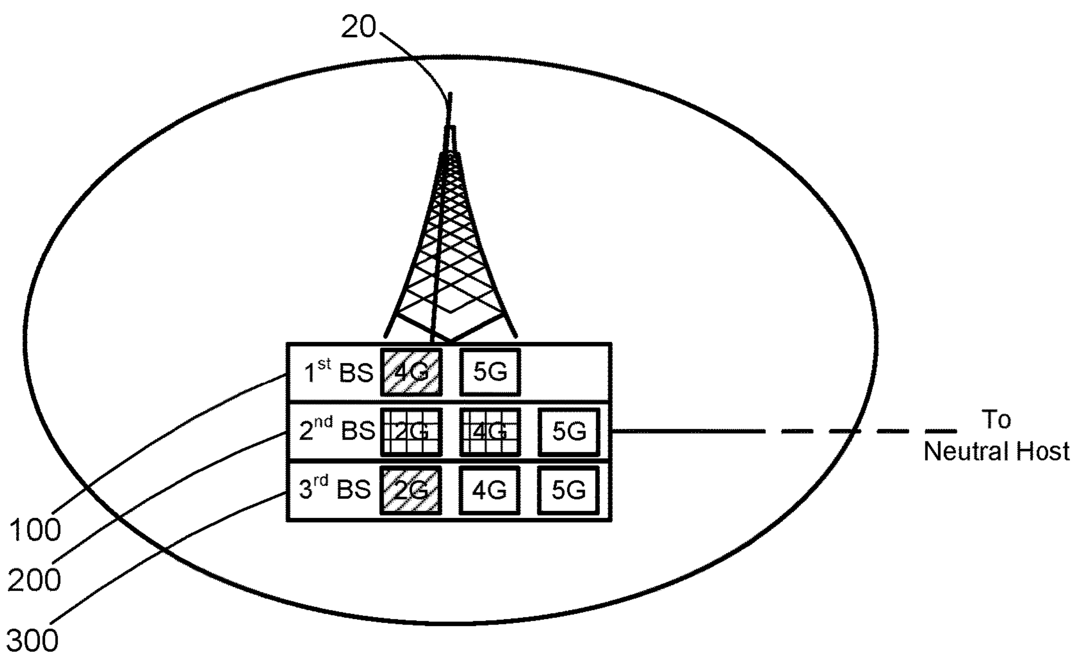
FIG. 8 is a schematic diagram of the cellular telecommunications network of FIG. 7, in a second configuration.

A second embodiment of a method of the present disclosure will now be described with reference to FIGS. 7 to 9. FIG. 7 illustrates the network in an initial state, which includes a first, second and third base station 100, 200, 300 at a cell site. The first and second base station 100, 200 are identical to those described in the first embodiment above, and the third base station 300 is additionally deployed on the same mast 20 of the cell site 10. The third base station 300 is operated by a third MNO, and the neutral host is responsible for managing the third base station 300 (via the controller 42) and for routing traffic between the third base station 300 and the third MNO's core network (via the router 24). The third MNO's core network also includes a third MME, which also includes a database of tracking area codes in which a first set of tracking area codes are for base stations that provide a circuit switched voice service to users of the third MNO's network and a second set of tracking area codes are for base stations that do not provide a circuit switched voice service to users of the third MNO's network. In this embodiment, the first set of tracking area codes in the third MME's database includes a fifth tracking area code and the second set of tracking area codes in the third MME's database includes a sixth tracking area code.

The third base station 300 is configured to provide a 2G service, 4G service and 5G service to its users.

In this initial configuration, the first base station 100 broadcasts the second tracking area code (indicating that it does not provide a circuit switched voice service to users of the first MNO's network), the second base station 200 broadcasts the third tracking area code (indicating that it does provide a circuit switched voice service to users of the second MNO's network) and the third base station 300 broadcasts the fifth tracking area code (indicating that it does provide a circuit switched voice service to users of the third MNO's network).

Figure 9:
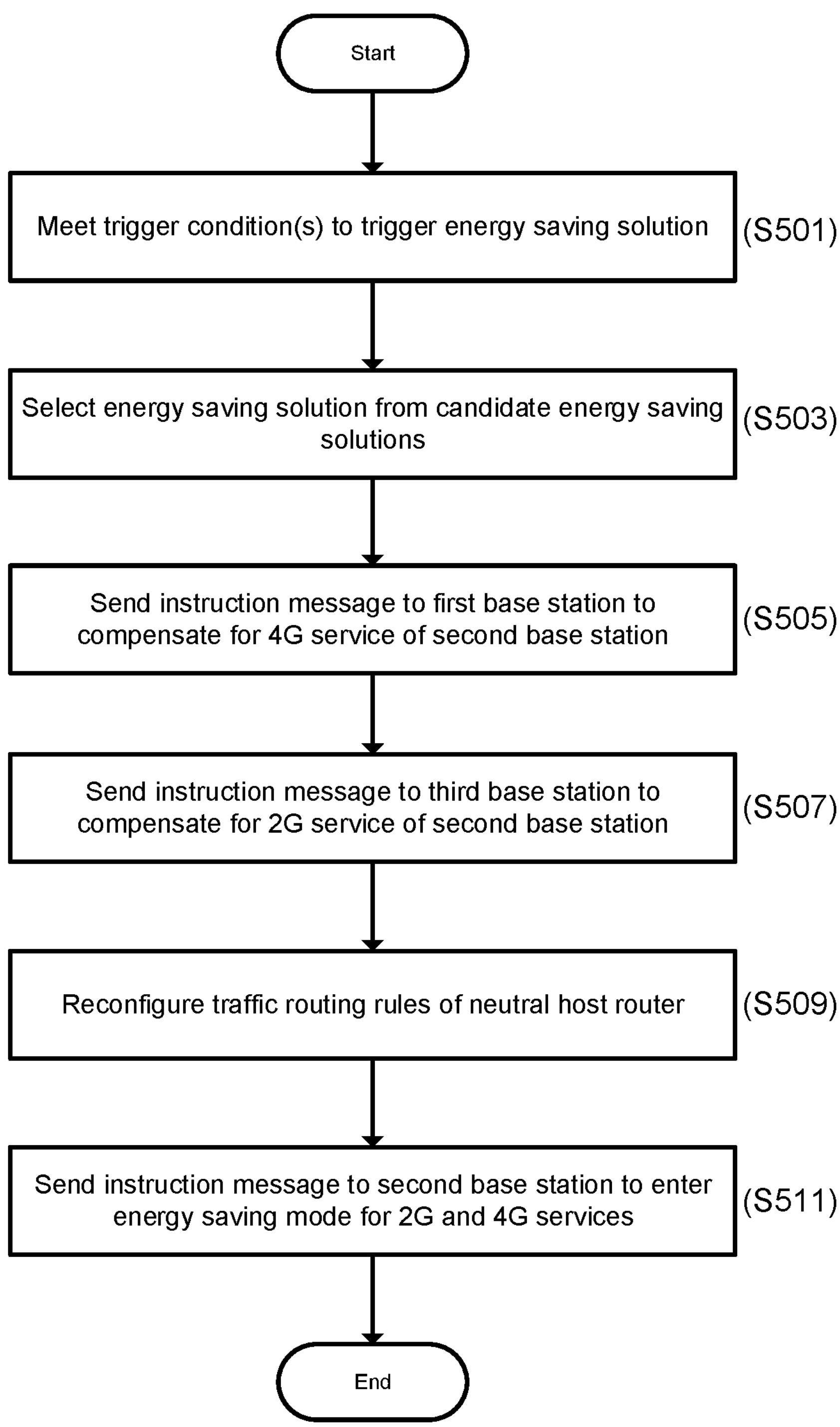
FIG. 9 is a flow diagram illustrating the second embodiment of the method of the present disclosure.

In S501, as shown in the flow diagram of FIG. 9, the neutral host controller 42 performs the first process (as described above in relation to FIG. 2) and determines that an energy saving threshold for at least one base station has been met. This triggers S503, in which the neutral host controller 42 performs the second process (as described above in relation to FIG. 3) so as to evaluate an overall score (based on the energy saving score and compensation score) for each candidate energy saving solution. As there are three base stations each with multiple protocols, there are many different candidate energy saving solutions available (and not all will be identified in this description). In this embodiment, all options that involve the first base station 100 entering energy saving mode produce relatively low overall scores (e.g. due to a negative influence of one or more of the load factor, desirability factor, and/or cost factor). Furthermore, all options that do not ensure continuity of the 2G service (i.e. when one or both of the second and third base stations 200, 300 enter energy saving mode for at least their 2G service and no compensation for the 2G service is provided by another base station) all have very low overall scores (e.g. due to the negative influence of the cost factor). In this second embodiment, the candidate energy saving solution having the greatest overall score is for the second base station 200 to enter energy saving mode for its 2G and 4G services (and therefore maintain its 5G service), the first base station 100 to compensate for its 4G service and the third base station 300 to compensate for its 2G service.

In S505, the neutral host controller 42 sends an instruction message to the first base station 100 to cause the first base station 100 to reconfigure to compensate for the 4G service of second base station 200. This includes a switch from a MORAN configuration to a MOCN configuration, in which the first base station 100 begins transmitting both the first MNO's Public Land Mobile Network (PLMN) identifier and the second MNO's PLMN identifier for the 4G transmissions, and accepts handovers and redirections of all 4G users being served by the second base station 200.

In S507, the neutral host controller 42 sends an instruction message to the third base station 300 to cause the third base station 300 to reconfigure to compensate for the 2G service of the second base station 200. This also includes a switch from a MORAN configuration to a MOCN configuration, in which the third base station 300 begins transmitting both the second MNO's PLMN identifier and the third MNO's PLMN identifier for 2G transmissions, and accepts handovers and redirections of all 2G users being served by the second base station 200. The third base station 300 also retrieves and subsequently broadcasts the third tracking area code from the second MME, indicating that it provides a circuit switched voice service to users of the second MNO's network (in addition to broadcasting the fifth tracking area code indicating that it provides a circuit switched voice service to users of the third MNO's network).

In S509, the neutral host controller 42 reconfigures the neutral host router 44 so that any traffic for the second MNO's 4G users now being served by the first base station 100 is routed between the first base station 100 and the second MNO's core network, and any traffic for the second MNO's 2G users now being served by the third base station 300 is routed between the third base station 300 and the second MNO's core network.

In S511, the neutral host controller 42 sends an instruction message to the second base station 200 to cause the second base station to enter energy saving mode for its 2G and 4G services. Following this reconfiguration, the second base station 200 switches from broadcasting the third tracking area code to broadcasting the fourth tracking area code (indicating that it does not provide a circuit switched voice service to users of the second MNO's network). The final state of the network is illustrated in FIG. 8.

Figure 10:
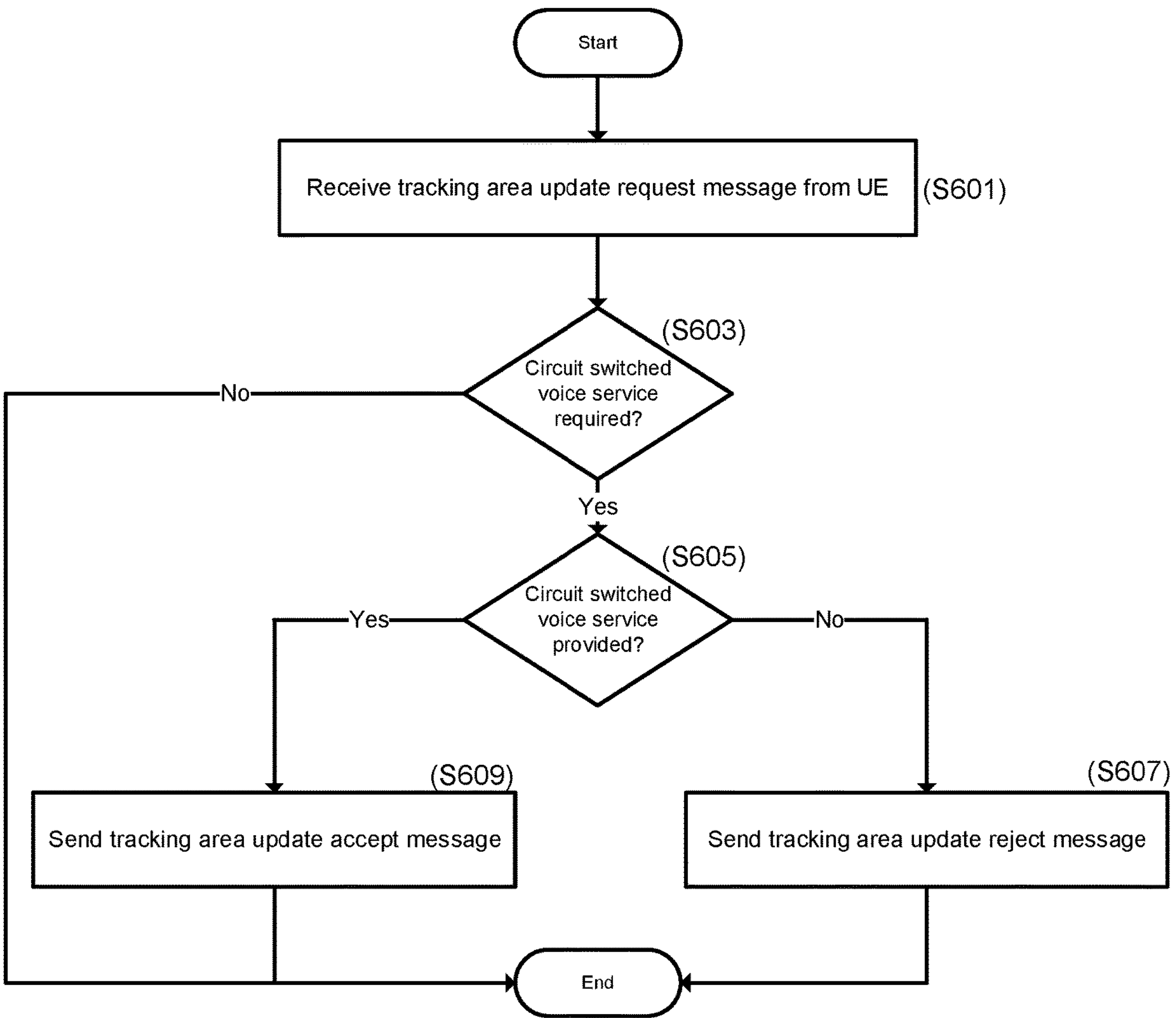
FIG. 10 is a flow diagram of a further process implemented in the first and second embodiments of the present disclosure.

The process illustrated in FIG. 10 may also be followed in this second embodiment to ensure that UE of the second MNO's network that require a circuit switched voice service do not connect to a base station that does not provide a circuit switched voice service.

In the above embodiments, the base stations are in a MORAN scenario such that the MNOs share the same cell site, mast and supporting equipment for their respective base stations. However, this is non-essential and there may be any form of sharing arrangement between the MNOs so long as the base stations are configurable to serve users of another MNO. Furthermore, it is non-essential that the base stations switch from a MORAN to a MOCN arrangement as the base stations may be reconfigured according to a sharing agreement.

In the second embodiment above, the third base station 300 is deployed at the same cell site. However, this is non-essential as the third base station may be positioned at another cell site and provide service to users of the base station entering energy saving mode (this may be by a change in the coverage area of the third base station). Furthermore, the third base station 300 may be owned by the same network operator as the base station entering energy saving mode, in which case there is no need for the third base station 300 to reconfigure its transmissions (as the PLMN is the same).

Furthermore, the skilled person will understand that the trigger for the energy saving switch (in the first process shown in FIG. 2) does not necessarily have to be based on one or the base stations that will enter energy saving or compensation mode. That is, it could be based on a neighboring base station. Furthermore, the first process may be implemented in the respective base stations, and a message may be sent to the neutral host controller following a trigger condition being met (the base station may also perform its own energy saving solution, such as entering energy saving mode for one of its services, before notifying the neutral host for a network-wide response).

In the above embodiments, the circuit switched voice service is a GSM 2G service. However, this is non-essential and the skilled person would understand that the above embodiments may apply to a circuit switched voice service of any protocol, such as the 3G voice service (as standardized by 3GPP).

The skilled person will also understand that the second process detailed above (as shown in FIG. 3) is exemplary and other processes may be implemented in which maintenance of the circuit switched voice service is a consideration in the energy saving solution.

In all embodiments detailed above, there may be a subsequent decision for the base stations to end energy saving mode and switch back to active mode. This may be based on the same triggers used in the first process, or based on independent triggers. Once the base station(s) have returned to active mode, users may be transferred back to the active mode base station, and the compensation mode base station may return to active mode. The neutral host controller and router may also be reconfigured to route user traffic via the user's serving base stations.

Furthermore, the above embodiments may be performed in an iterative manner so that a new energy saving solution may be determined as the most suitable, and the neutral host controller may instruct the relevant base stations to switch to this new energy saving solution.

The skilled person will also understand that it is non-essential for the various processes described above to be performed on the neutral host controller. That is, any entity in the cellular telecommunications network could implement the above processes, and would typically be supported by a sharing arrangement between the operators.

In the embodiments above, a base station may be required to reconfigure. Typically, a reconfiguration requires the base station to reboot, such that users lose service. Therefore, in an enhancement, such service interruption may be avoided by utilizing a multi-carrier base station. For example, users of a multi-carrier base station may be transferred between carriers so that one carrier is an unused carrier, and this unused carrier may be reconfigured to MOCN mode so that it may serve users of both its own operator and the operator of the base station to be reconfigured. Users of the base station to be reconfigured may then be transferred to the unused carrier of the multi-carrier base station, so that the base station to be reconfigured can be reconfigured without any service interruption to the users it previously served or to users of the multi-carrier base station. Furthermore, in the embodiments above where there are multiple candidate solutions, a negative impact to users during the transition from the network's current state to its final state may be analyzed as part of the selection process.

In the embodiments above, the tracking area codes transmitted by each base station indicate whether that base station either provides or does not provide a circuit switched voice service. However, the tracking area codes may more generally indicate whether that base station either supports or does not support a circuit switched voice service. That is, a base station may support a circuit switched voice service if it either provides a circuit switched voice service itself, or it does not provide a circuit switched voice service but facilitates fallback to a circuit switched voice service. Conversely, a base station may not support a circuit switched voice service if it does not provide a circuit switched voice service and it does not facilitate fallback to a circuit switched voice service. For example, in a modification to the first embodiment, following the reconfigurations of the first and second base stations (such that the first base station 100 enables a 2G service and the second base station 200 enters energy saving mode for its 2G service), the second base station 200 may still support circuit switched voice service to users of the second MNO's network if it facilitates circuit switched fallback to the first base station's newly enabled 2G service. In such a scenario, the second base station 200 may also broadcast the third tracking area code so that users (requiring circuit switched voice service) are permitted to connect to the second base station 200.

In the above embodiments, the MME stored a first set of tracking area codes identifying base stations that support or provide a circuit switched voice service and a second set of tracking area codes identifying base stations that do not support or provide a circuit switched voice service. This is non-essential and the skilled person will understand that other implementations are possible. For example, the MME may store a single list of tracking area codes which identify base stations that support or provide a circuit switched voice service, and the MME would then only permit access to a base station if the tracking area update request included a tracking area code on that list. In another example, the MME may store a single list of tracking area codes which identify base stations that do not support or provide a circuit switched voice service, and the MME would then only permit access to a base station if the tracking area update request included a tracking area code is not on that list.

The skilled person will understand that any combination of features is possible within the scope of the disclosure, as claimed.

The invention claimed is:

1. A method of operating a management node in a cellular telecommunications network, the cellular telecommunications network comprising a base station and a User Equipment (UE), wherein the base station transmits a tracking area code to the UE indicating to the UE that the base station does not support a circuit switched voice service, the method comprising:

receiving a tracking area update request message from the UE, the tracking area update request message including the tracking area code broadcast by the base station;

determining that the UE requires a circuit switched voice service;

determining, based on the tracking area code, that the base station does not support the circuit switched voice service; and based on the determinations, sending a tracking area update reject message to the UE.

2. A network node in a cellular telecommunications network, the cellular telecommunications network comprising a base station and a User Equipment (UE), wherein the base station transmits a tracking area code to the UE indicating to the UE that the base station does not support a circuit switched voice service, the network node comprising:

at least one processor and memory configured to:

receive a tracking area update request message from the UE, the tracking area update request message including the tracking area code broadcast by the base station;

determine that the UE requires a circuit switched voice service;

determine, based on the tracking area code, that the base station does not support the circuit switched voice service; and based on the determinations, send a tracking area update reject message to the UE.

3. A non-transitory computer readable storage medium comprising computer-readable code operable, when loaded on and executed by a computer, to cause the computer to operate a node in a cellular telecommunications network, the cellular telecommunications network comprising a base station and a User Equipment (UE), wherein the base station transmits a tracking area code to the UE indicating to the UE that the base station does not support a circuit switched voice service, by:

receiving a tracking area update request message from the UE, the tracking area update request message including the tracking area code broadcast by the base station;

determining that the UE requires a circuit switched voice service;

determining, based on the tracking area code, that the base station does not support the circuit switched voice service; and based on the determinations, sending a tracking area update reject message to the UE.

* * * * *